United States Patent Office 3,491,856
Patented Jan. 27, 1970

3,491,856
VENTILATED DISK BRAKE APPARATUS
Albert G. Dean, Narberth, Pa., assignor to The Budd Company, Philadelphia, Pa., a corporation of Pennsylvania
Filed Sept. 30, 1968, Ser. No. 763,889
Int. Cl. F16d 65/84
U.S. Cl. 188—264                    1 Claim

ABSTRACT OF THE DISCLOSURE

An apparatus for control of air flow through a dual disk rotor attached to a wheel of a railway vehicle to prevent loss of power due to movement of air through the rotor at high speeds of rotation. A shield is movable by an actuator to one position to block the flow of air through the rotor, and to another position to admit air therethrough to dissipate some of the heat energy due to braking operations.

---

This invention relates to improved ventilated disk brake apparatus for railway cars, and more particularly, to such apparatus for controlling the air flow through such ventilated disks. The present invention is an improvement on that disclosed in my prior Patent Number 3,366,203 issued Jan. 30, 1968.

It has been found that the energy required to produce high volumes of air moving through a ventilated brake disk is noticeable at speeds above 100 m.p.h. At speeds up to 160 m.p.h. as contemplated on the present New York-Washington high-speed passenger railroad projects, the energy required would be significant. Such a disk rotating at 160 m.p.h. will consume on the order of 18 horsepower circulating air whether it is needed for cooling or not. High volumes of air nevertheless are required to obtain maximum steady state energy dissipation and minimum cool down time for the brake disks. As an example of the energy dissipation required, it may be noted that at 160 m.p.h. the kinetic energy of a 172,000 lb. railway passenger car is about 147 million foot lbs. or 188,000 B.t.u.'s, and at 120 m.p.h., about 80 million foot lbs. or 106,000 B.t.u.'s. From the foregoing it can be thus seen that the flow of air through the rotor should be blocked to prevent loss of energy in one state and opened to facilitate the maximum cooling in the other state.

Unsatisfactory results have been obtained in an arrangement embodying the use of tread brake units applied directly to the wheels. The repeated brake operations have produced heat-checking failure in such wheels due to the intense heat produced. A further arrangement, embodying the use of single wide cast iron disk per axle, though capable of handling emergency braking loads, has likewise been found unsatisfactory in its inability to handle the heavy duty loads imposed during repeated duty cycles of operation.

It is therefore the principal object of this invention to provide an improved disk brake apparatus which avoids one or more of the disadvantages of the prior art arrangement.

It is a further object of this invention to provide an improved disk brake apparatus which controls the air flow through the ventilated disk during the time braking forces are applied to the disk, and during its running operation thereof.

In accordance with the invention, a conventional ventilated brake disk assembly is mounted on a well known wheel and axle unit of a truck. The assembly includes a pair of circular disks which are disposed inboard and outboard of and separated by a plurality of fins. Closure means adjacent the air intake area of the assembly are provided to monitor the air flow generated between the inboard and outboard disks to thereby govern the amount of horsepower required to drive the assembly as required at the various speed ranges and braking demands of the car.

For a better understanding of the invention, together with other and further objects thereof, reference is had to the following description taken in connection with the accompanying drawing.

Figure 1:
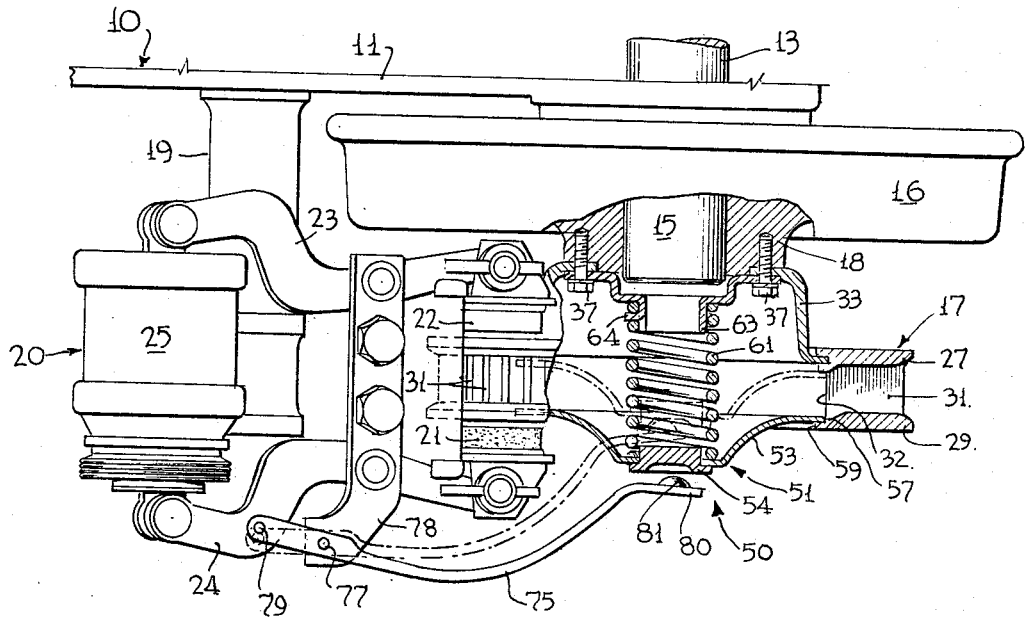
FIG. 1 is a top plan view of a portion railway passenger car truck partially in section embodying the invention.

Referring now to the drawings, the invention is illustrated as applied to a railway passenger car truck 10 only a portion of which is shown having a pair of side frames 11, which in turn are supported by a pair of wheel axle-units 13, only one shown for clarity. Each of these units comprise an axle 15 and a pair of laterally spaced wheels 16.

Each wheel 16 of axle-unit 13 has associated therewith a ventilated brake disk assembly 17 which is fixedly secured to the hub 18 of the wheel. A bracket assembly 19 mounted on truck side frame 11 supports a unit brake assembly 20, comprising brake shoes 21, 22, a pair of brake tong levers 23, 24 and a brake actuator 25. The brake shoes 21, 22 engage disk assembly 17 which includes a pair of annular friction disks, 27, inboard, 29, outboard, connected in spaced apart relationship by a plurality of cooling fins extending therebetween. The fins 31 are flat, and are radially spaced to provide a plurality of air passages between the fins, through which air flows to cool the fins and the disks. The fins 31 include flat inboard edge portions 32 which extend between the opposed inboard and outboard disk portions 27, 29 respectively, and are parallel to the axis of rotation of the disk assembly. A flanged hub plate 33 connected at its outer periphery to inboard friction plate 27 is secured at its inner periphery to the hub 18 of wheel 16 by volts 37 in a manner to rotate the friction plates 27, 29 at right angles to the axis of axle 15. The hub plate prevents air from coming in from the side of the disk 27 and flowing past fins 31 and disks 27, 29. Normally the energy required to produce a flow of moving air through the ventilated disk assembly 17 is relatively insignificant at slow speeds of a passenger car; however, at high r.p.m. the energy required to obtain maximum thermal capacity and minimum cool down time for the frequent duty cycle of brake application becomes significant.

In accordance with the invention air flow control means 50 are provided to govern the amount of horsepower required to drive the ventilated disk assembly 17 at various speed ranges and braking demands. For this purpose plate means 51 comprising a plate 53 and a wear pad 54 are mounted for axial movement relative to the disk assembly 17. The plate 53 is dished outwardly in its central portion as at 55. The perimeter 57 of the disk plate rides on the aforementioned inner flat edges 32 of the fins 31. The amount of offset of the central dished portion 55 of the plate 53 corresponds roughly to the width of the fins 32. The outer friction plate 29 includes a central opening 59, of slightly smaller diameter than plate 53. The marginal edge of the opening limits outward axial movement of the plate beyond the plane of the friction plate.

During the high speed operation of the railway vehicle the power drain as the result of air flowing through the disk assembly 17 would be considerable. It is desirable therefore to close the outer opening 59 in the outermost friction plate 29. For this purpose a compression spring 61 is suitably secured interiorly of the disk assembly 17 and along the axis of the dished portion 55 of the plate 53. The innermost convolution of the coil spring is secured by a suitable spring retainer plate 63 which in turn is secured by the aforementioned screws 37. Tab 64 struck from plate 63 engages the inner convolution of spring 61. The outermost convolution of the coil spring may be secured to the flanged wear plate 54 of the dished portion 55 of the plate. The compression spring 61 as seen in FIG. 1 is effective during normal high speed operations of the disk to cause the dished plate member 53 to be extended in one direction outwardly to seal the opening 59 by abutting against the inner face 60 of the friction plate 29.

Figure 2:
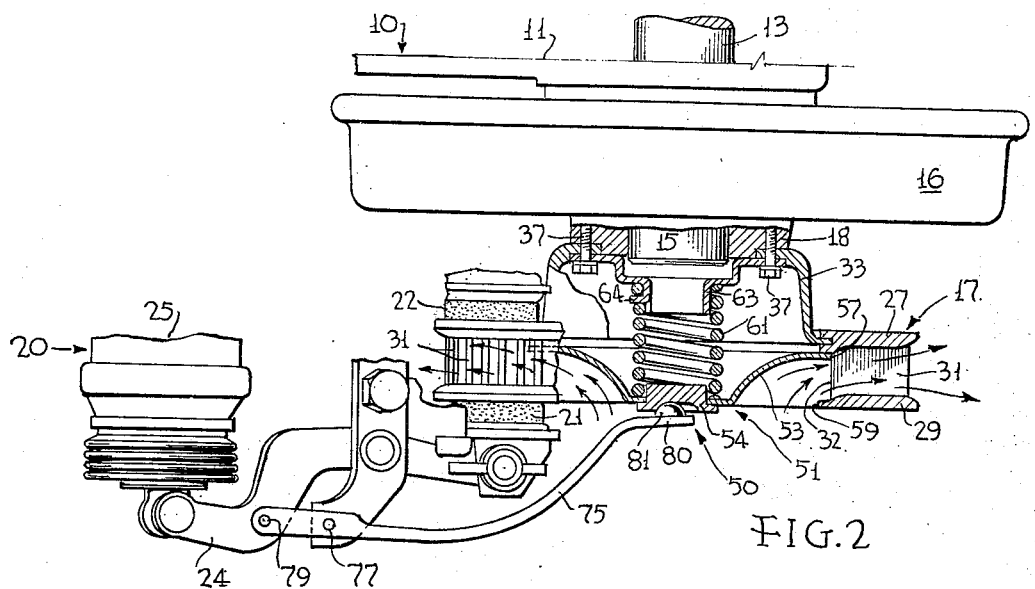
FIG. 2 is a view similar to FIG. 1, and showing the air flow control means in another position from that shown in FIG. 1.

In order to permit the flow of air through the disk assembly 17 to provide a cooling action when the brakes are applied, means are provided to move the aforementioned plate 53 inwardly as seen in FIG. 2. For this purpose an elongated lever 75 is suitably fulcrumed as at 77 to a fixed or stationary bridge member 78 which extends between the aforementioned tong levers 23, 24. The outermost end of the lever member 75 is additionally pivoted to tong arm 24 as at 79. The opposite outer end 80 of the lever arm has a curved wear element 81 affixed to it to engage the aforementioned wear plate 54 attached to plate 53. During the non-duty cycle of the brakes a slight space exists between the outermost faces of friction plates 27, 29, and the corresponding brake shoe lining elements 22 and 21 respectively. When the brakes are applied this space is taken up and tong lever arm 24 is fulcrumed about its pivot. The pivot end 79 of lever 75 is caused to travel with tong arm 24. Due to the location of fulcrum 77 along lever 75 a slight movement of the pivot end 79 of the lever will produce a large movement at its outer end 80. The end portion 80 of the lever may thus be moved an amount to throw the cover plate 53 from its closed position shown in FIG. 1 to its open position shown in FIG. 2. The lever 75 is of generally flexible material but has sufficient rigidity such that when it is brought into engagement with the cover plate 53 it will exert an amount of force to cause the coil spring 61 to be compressed. When the latter plate 53 is moved to its innermost position as shown in FIG. 2 opening 61 is uncovered and air is permitted to flow through the disk assembly 17 to accomplish a cooling function.

With reference now to FIG. 1 it will be noted that the lever 75 in its normal inoperative state is free of the disk member 53. By virtue of the gap there can be no wear and no contact under normal operation of the disk.

While there has been described what at present is considered to be the preferred embodiment of this invention, it will be obvious to those skilled in the art that various changes and modifications may be made therein without departing from the invention, and it is therefore aimed in the appended claim to cover all such changes and modifications as fall within the true spirit and scope of the invention.

What is claimed is:

1. In braking apparatus for a railway car wheel having disk means with an opening to enable flow of air therethrough and associated actuator means with braking elements for co-acting with said disk means, the combination comprising, plate means supported by said disk means, spring means interposed between said plate means and said disk means, said spring means urging said plate means axially of said wheel in one direction to a closed position to block said opening to prevent the flow of air through said opening and through said disk means, support means adjacent said actuator means, lever means pivotally connected intermediate its length to said support means, said lever means having one end connected to said actuator means and having an opposite end portion in one position of movement of said lever spaced from said plate means, said lever means being movable to another position by said actuator means to cause said opposite end portion to move said plate means against the urging of said spring means to an open position to enable air flow through said disk means.

References Cited

UNITED STATES PATENTS 2,198,027     4/1940     Farmer _____ 188—264

GEORGE E. A. HALVOSA, Primary Examiner

U.S. Cl. X.R.

192—113